United States Patent
Hodge et al.

(10) Patent No.: US 9,122,899 B2
(45) Date of Patent: Sep. 1, 2015

(54) CARD CONNECTOR WITH IMPROVED HEAT-DISSIPATION, RETENTION, AND ESD PROTECTION FEATURES

(71) Applicant: Genesis Technology USA, Inc., Norcross, GA (US)

(72) Inventors: Ronald L. Hodge, Flowery Branch, GA (US); Tau Chuan Chen, Duluth, GA (US)

(73) Assignee: GENESIS TECHNOLOGY USA, INC., Norcross, GA (US)

( * ) Notice: Subject to any disclaimer, the term of this patent is extended or adjusted under 35 U.S.C. 154(b) by 6 days.

(21) Appl. No.: 14/088,044

(22) Filed: Nov. 22, 2013

(65) Prior Publication Data
US 2014/0162490 A1   Jun. 12, 2014

Related U.S. Application Data

(60) Provisional application No. 61/734,181, filed on Dec. 6, 2012.

(51) Int. Cl.
*G06K 7/00* (2006.01)
*H01R 13/648* (2006.01)

(52) U.S. Cl.
CPC .............. *G06K 7/00* (2013.01); *H01R 13/6485* (2013.01)

(58) Field of Classification Search
CPC ..................... H01R 13/65802; H01R 23/6873; H01R 23/7073; H01R 13/658
See application file for complete search history.

(56) References Cited

U.S. PATENT DOCUMENTS

| | | | | |
|---|---|---|---|---|
| 5,319,156 A | * | 6/1994 | Fonteneau et al. | 439/607.17 |
| 5,478,260 A | * | 12/1995 | Kaufman et al. | 439/607.31 |
| 7,134,912 B2 | * | 11/2006 | Kamata et al. | 439/607.31 |
| 7,161,811 B2 | * | 1/2007 | Richter | 361/737 |
| 7,938,684 B2 | * | 5/2011 | Lin | 439/607.4 |
| 8,079,874 B2 | * | 12/2011 | Lee et al. | 439/607.32 |
| 8,317,542 B2 | * | 11/2012 | Abraham | 439/607.31 |
| 2012/0083157 A1 | * | 4/2012 | Abraham | 439/607.31 |
| 2012/0295481 A1 | * | 11/2012 | Zhang | 439/607.22 |
| 2013/0012065 A1 | * | 1/2013 | Gao et al. | 439/607.31 |
| 2013/0137301 A1 | * | 5/2013 | Huang | 439/607.22 |

OTHER PUBLICATIONS

H & V Smart Card Acceptor—600 Series B (Friction Technology) Published by Hamburg, 2013-2014 [online][retrieved on Nov. 21, 2013] retrieved from: http://www.hamburg.com.tw/eng/PDF/iccard/600series.pdf , 6 pps.

Smart Card Connector ICA-620, published by Hamburg Industries Co. Ltd., Nov. 21, 2013 [online][retrieved on Nov. 21, 2013] retrieved from: http://www.acesuppliers.com/Supplier , 2 pps.

Translated Chinese Office Action mailed Oct. 11, 2014 for Chinese patent application No. 201080063820.5, a counterpart foreign application of U.S. Appl. No. 14/088,044, 7 pages.

* cited by examiner

*Primary Examiner* — Gary Paumen
(74) *Attorney, Agent, or Firm* — Lee & Hayes, PLLC; Charles L. Warner

(57) ABSTRACT

A card connector for use with a card comprising electronic circuitry and a card reader device comprising electronic circuitry which can communicate with the card. The card connector is configured to receive the card when the card is inserted into the card reader. The card connector has a connector body and an attached cover. The connector body includes a plurality of electronic contacts that engage the card circuitry and operationally link the card to the card reader device. The cover includes one or more retaining springs which engage the card to secure the card and draw heat from the card. The cover also has a lip or tongue and grounding tabs which provide electrostatic discharge protection.

18 Claims, 19 Drawing Sheets

CARD CONNECTOR WITH IMPROVED HEAT-DISSIPATION, RETENTION, AND ESD PROTECTION FEATURES

CROSS-REFERENCE TO RELATED APPLICATION

This application claims the priority of U.S. Provisional Patent Application No. 61/734,181, filed Dec. 6, 2012, the entire disclosure and contents of which are hereby incorporated by reference herein.

BACKGROUND

Smart cards are utilized in various types of electronic devices to provide authentication and other types of functionality. For instance, cellular telephones typically have a Subscriber Identity Module (SIM) card reader and satellite television receivers typically include a smart card reader. Subscribers are issued a SIM or smart card which, when inserted into the card reader in an appropriate device will allow the subscriber to be authenticated as an authorized user.

SIM and smart cards (herein "card") typically include embedded integrated circuits. When inserted into an appropriate card reader, power is applied to the card thereby powering the embedded integrated circuits. The integrated circuits embedded on a card can generate significant heat, especially when utilized in small passively cooled electronic devices, such as set-top boxes.

It is with respect to these considerations and others that the disclosure made herein is presented.

SUMMARY

A card connector for use with a card comprising electronic circuitry and a card reader device having electronic circuitry which can communicate with the card. The card connector has a connector body and a heat conductive cover. The connector body has electrical contacts which may functionally connect the electronic circuitry of the card to the electronic circuitry of the device when the card is inserted into the card connector. The heat conductive cover is attached to the connector body and is in thermal contact with the card when the card is inserted into the card connector. The heat conductive cover may have one or more heat conducting springs for engaging the card when the card is inserted into the card connector. The heat conductive cover may also have grounding tabs to provide protection against electrostatic discharge.

DETAILED DESCRIPTION

Figure 1:
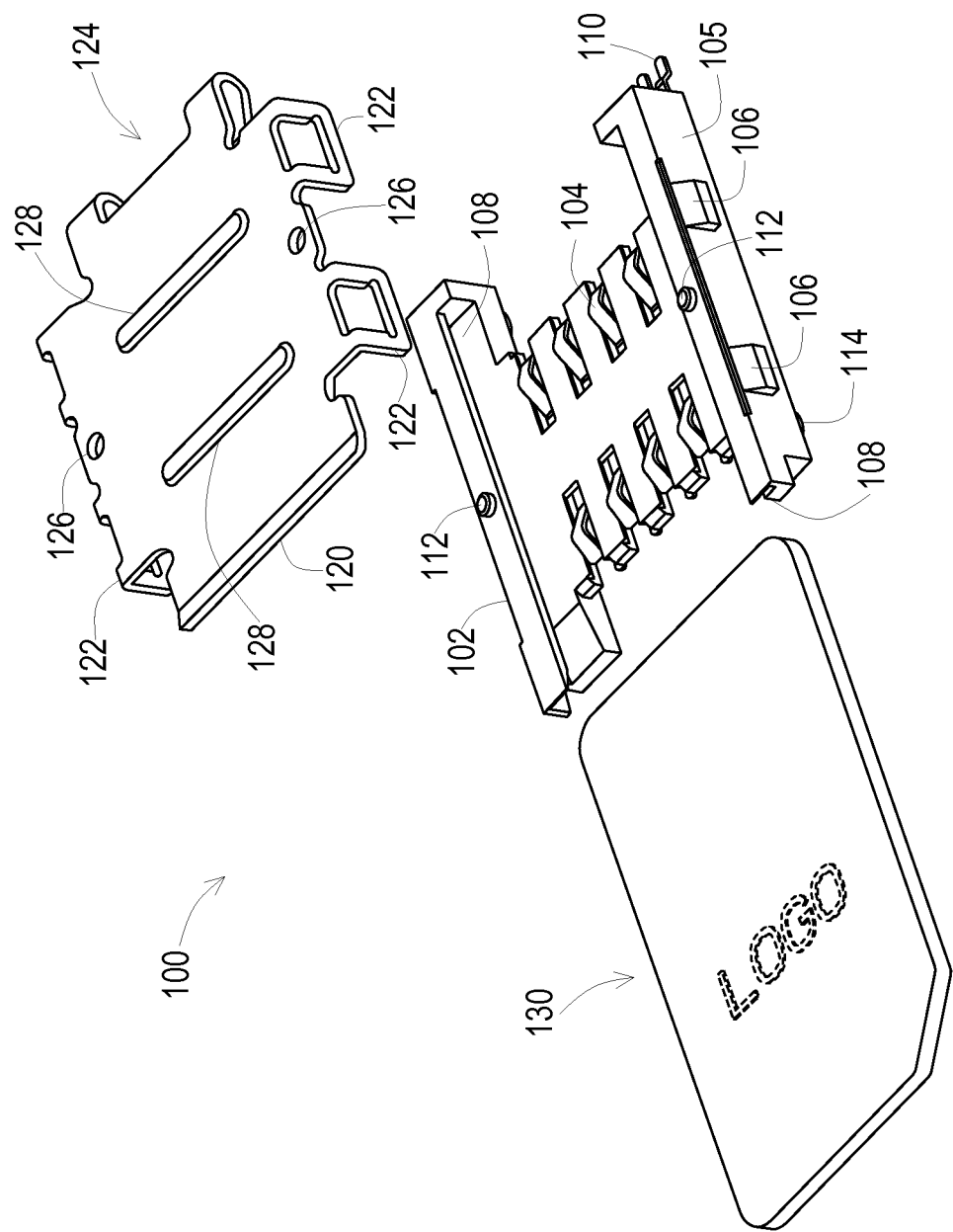
FIGS. 1 and 2 are exploded perspective diagrams showing an exemplary card connector according to the present disclosure.

The following Description is directed to technologies for a card connector with heat-dissipating, card retaining, and electrostatic discharge (ESD) protection features. The card connector embodiments disclosed herein can dissipate heat generated by a smart card or other type of card that includes embedded electronics or circuitry (not shown). The card connector embodiments disclosed herein can minimize or eliminate curling, warping, buckling, shortened lifetime or failure of the electronic circuitry, and similar damage to the card associated with exposure to heat. In addition, the card connector embodiments disclosed herein can engage a card to increase the force required to fully insert the card and to disengage the card, thereby reducing the likelihood of an intermittent connection due to the card not being fully engaged, the card partially disengaging, or the card not making and maintaining good electrical contact. Further, the card connector provides for ESD protection.

In the following Description, references are made to the accompanying drawings that form a part hereof, and which are shown by way of illustrated embodiments or examples. Referring now to the drawings, in which like numerals represent like elements through the several figures, aspects of apparatus, system, and methodology for a card connector with heat-dissipating and retaining features will be described.

Figure 2:
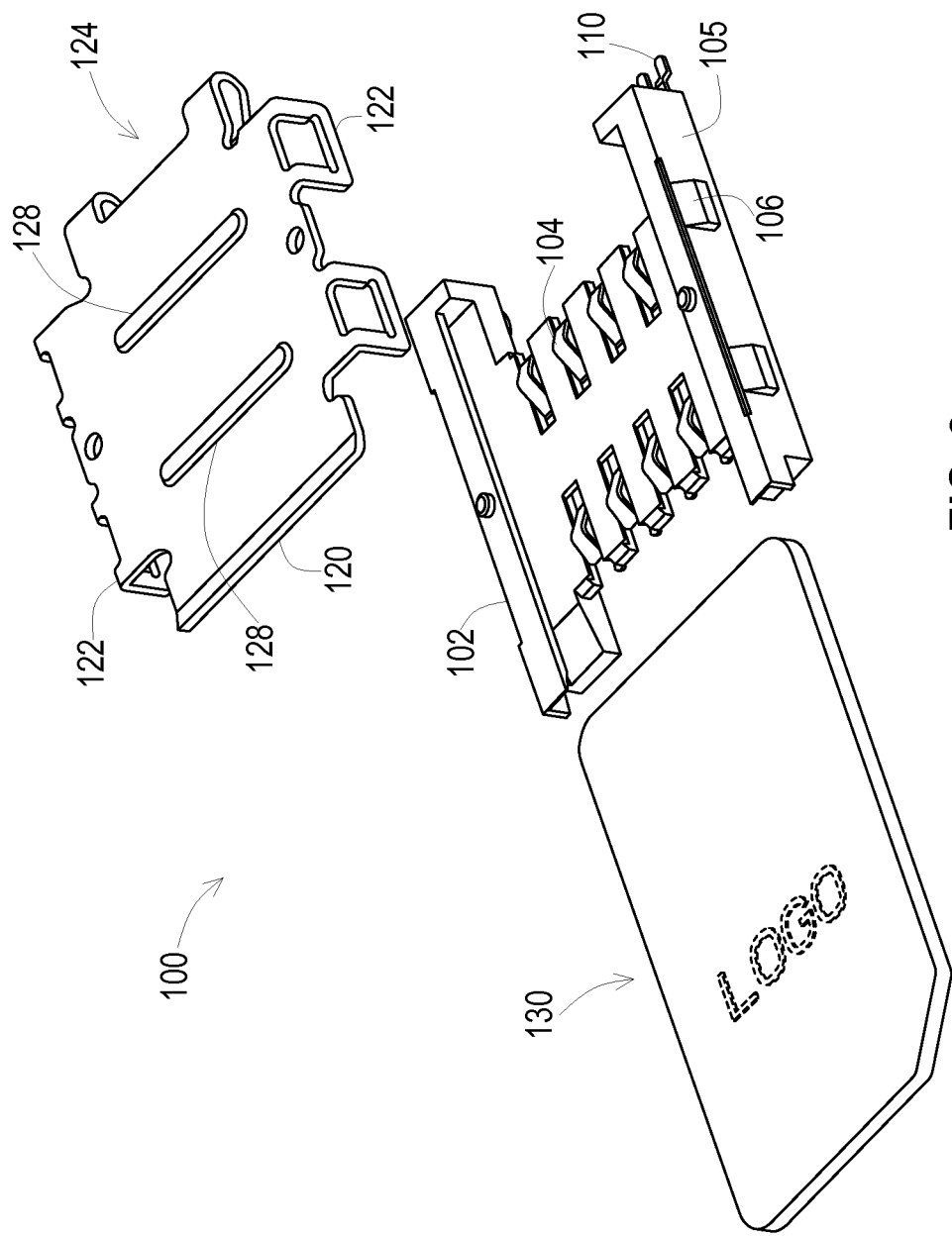

FIGS. 1 and 2 are exploded perspective diagrams showing various aspects of an exemplary card connector 100 (herein "card connector 100") disclosed herein. The illustrated card connector 100 includes a body 102 and a heat conductive cover 120. Also shown is a card 130, which can be inserted into an assembled card connector 100, as described herein. The body 102 is constructed primarily of a molded thermoplastic, such as but not limited to polybutylene terephthalate (PBT) or liquid crystal polymers (LCP). In some embodiments the body 102 might be constructed from other types of non-conductive materials or composites, such as but not limited to ceramic. In alternative embodiments the body 102 may include integral or attached elements that are conductive, in that those elements may conduct electrical current or heat.

The card connector 100 shown in FIGS. 1 and 2 might also be utilized in and communicatively coupled to any type of electronic device that might receive and obtain data from a card, such as but not limited to a cellular telephone, a set-top box, an automatic teller machine (ATM), a vending machine, a point of sale device, combinations thereof, and the like. It should be appreciated that while the card connector 100 disclosed herein is generally described in the context of a substantially planar smart card, chip card, integrated circuit card (ICC card), combinations thereof and the like, the card connector 100 elements might be shaped for connecting, coupling, linking, or engaging any type of device comprising circuitry or embedded electronics from which data may be retrieved.

The body 102 is sized and configured such that it can receive a card or other type of card device, and is attached to a mounting surface and communicatively coupled or operationally engaged to the circuitry of an electronic device, such as a printed circuit board. For instance, the card connector 100 may be attached to a mounting surface that is a printed circuit board in a satellite television receiver and configured to receive a smart card for authenticating television services.

As shown in FIGS. 1 and 2, the body 102 has at least one set of resilient conductive electronic contacts 104, attached to or integrally molded to the body 102, which are configured to communicatively couple or otherwise operationally engage with the electronic circuitry of the card 130 inserted into the card connector 100. The electronic contacts 104 may be connected to suitable electronic contacts on the printed circuit board to which the card connector 100 is communicatively coupled. As is also shown, the body 102 includes switch contacts 110 positioned inside a rail 108 and connected to suitable electronic contacts on the printed circuit board.

Each outward facing surface of the sidewalls 105 includes one or more engaging tabs 106, configured to attach the heat conductive cover 120. In the illustrated embodiment there are two engaging tabs 106 on each sidewall 105. Other embodiments may include more engaging tabs 106. The inward facing surface of each sidewall 105 includes a rail 108, configured to receive and direct the card 130 into the card connector 100.

Figure 19:
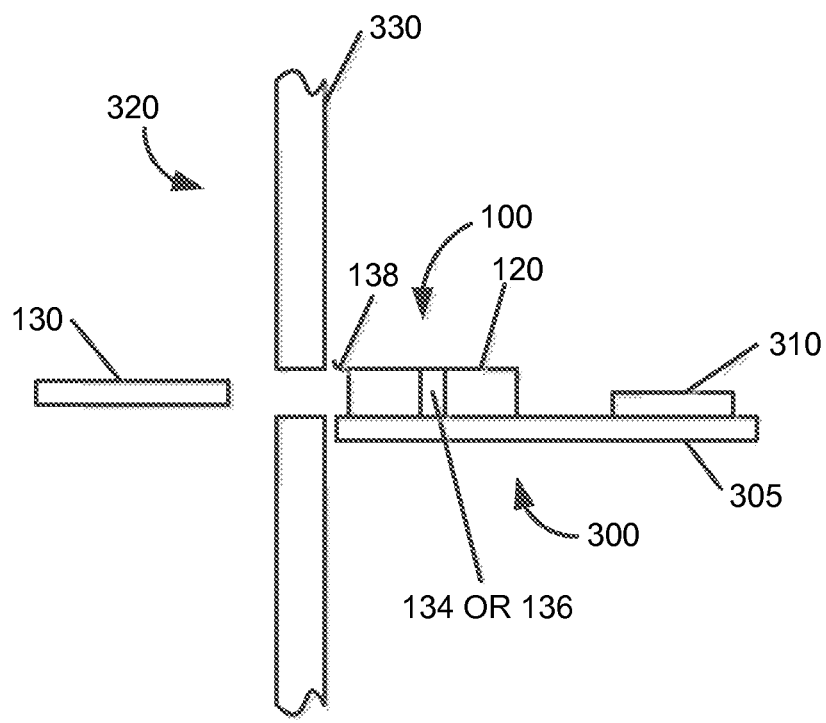
FIG. 19 is an illustration of a possible installation of a card connector in a card reader having a circuit board and electronic circuitry.

Other features of the illustrated body 102 include one or more engaging posts 112 and mounting posts 114. The engaging posts 112 are configured to attach the heat conductive cover 120 to the body 102, and the mounting posts 114 are configured to attach the body 102 to a mounting surface on, for example, a circuit board (FIG. 19).

The illustrated heat conductive cover 120 comprises engaging clips 122, a retaining spring 124, engaging post apertures 126, and stiffener ribs 128. One or more engaging clips 122 are configured to attach to a corresponding number of engaging tabs 106, which together attach the heat conductive cover 120 to the body 102.

The retaining spring 124, located at one end of the heat conductive cover 120, is configured to receive and retain a card 130 fully inserted into the card connector 100. In the illustrated embodiment the retaining spring 124 is located at the end of the heat conductive cover 120. In other embodiments one or more retaining springs 124 are positioned at the end of the body 102 to engage the card 130, along the sides of the heat conductive cover 120 and facing inwardly to engage the card 130, and/or along the side of the body 102 and facing inwardly to engage the card 130.

The retaining spring 124 exerts a force on a fully inserted card 130. In the illustrated embodiment the retaining spring 124 is configured to engage and retain the card 130 such that a force of approximately 3N to approximately 7N (3-7 newtons) (0.67-1.57 pounds) is required to fully insert the card 130 into, or disengage a fully inserted card 130 from, the card connector 100. The retaining spring 124 is adjustable, such that the force the retaining spring exerts on the card 130 may be varied by bending or spreading the springs. In some embodiments the retaining spring 124 exerts a force less than 3N; in other embodiments the retaining spring 124 exerts a force greater than 7N.

The engaging post aperture 126 is configured to receive a respective engaging post 112, to further attach the heat conductive cover 120 to the body 102. The heat conductive cover 120 further comprises one or more stiffener ribs 128. In the illustrated embodiment the stiffener ribs 128 are constructed by embossing during manufacture of the heat conductive cover 120, such as by stamping. In other embodiments the stiffener ribs 128 are separate elements, such as lengths of heat conductive material attached to the heat conductive cover 120.

Figure 3:
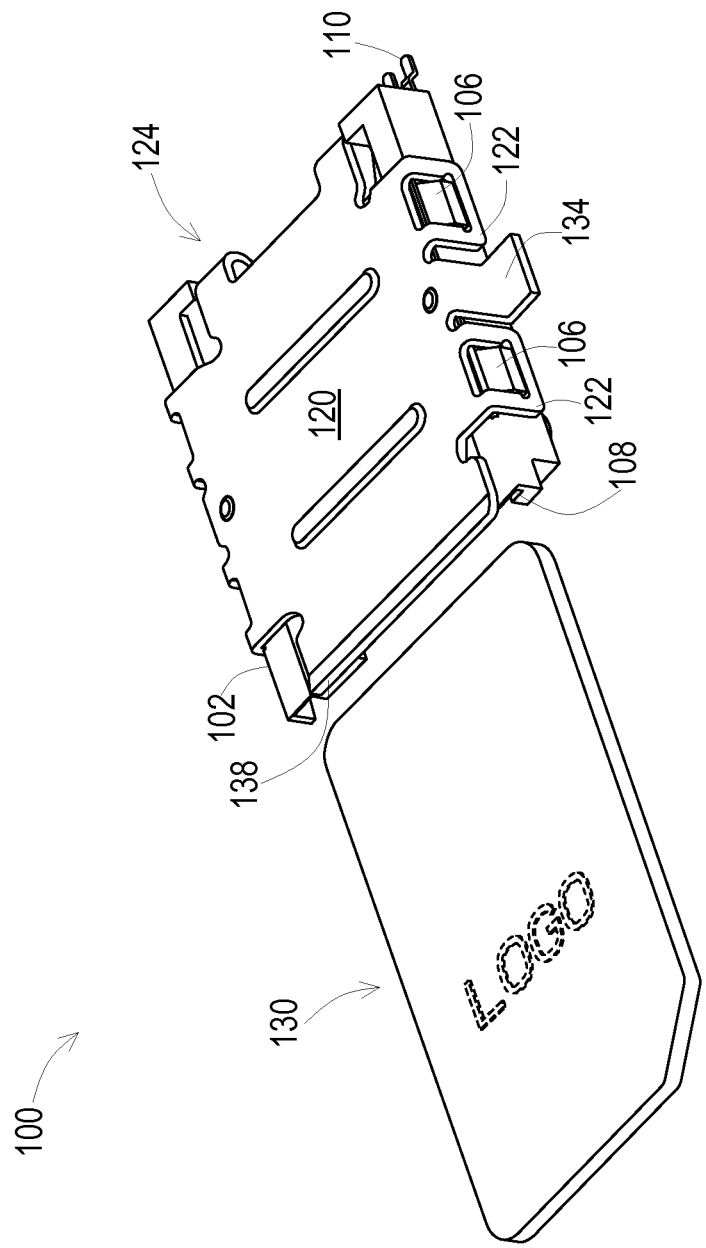
FIGS. 3 and 4 are perspective diagrams showing an exemplary assembled card connector according to the present disclosure.
Figure 4:
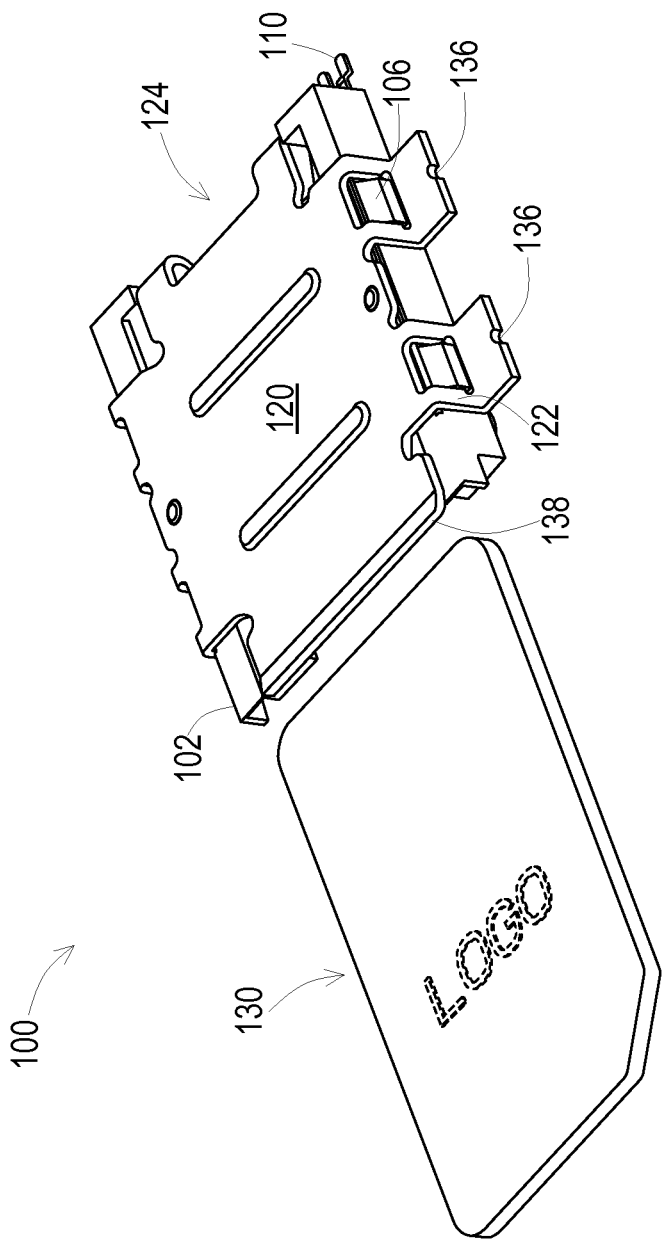

FIGS. 3 and 4 show a body 102 attached to a heat conductive cover 120 to form an assembled card connector 100. More specifically, the tabs 106 and clips 122 are engaged, and the posts 112 and apertures 126 are engaged. An assembled card connector 100 may be mounted within a device 300 (FIG. 19) and the switch contacts 110 communicatively or electronically attached to a circuit 305 (FIG. 19). FIGS. 3 and 4 also show a card 130 prior to being inserted into the card connector 100.

The heat conductive cover 120 is configured to be immediately adjacent to, or make contact with, a card inserted into the card connector 100 and to transmit, transfer, dissipate, or otherwise disperse the heat generated by the card. Heat may be dissipated by the heat conductive cover 120 itself, and/or may be transferred to another heat-dissipating surface, such as a platform, chassis, or case of an electronic device within which the card connector 100 is installed.

When the air is cold and dry, a person walking toward a machine 320 (FIG. 19) having a card reader 300 may acquire a static electricity charge. The front panel of a card reader is typically a nonconductive material so, when a card is inserted into the card reader, an electrostatic discharge (ESD) may occur from the card to the contacts 104. This SD can damage or destroy the electronic circuitry 310 in the card reader. Therefore, preferably, the cover 120 is connected to ground so that the ESD will occur from the card 130 to the cover 120, which is connected to ground, thereby reducing or eliminating any ESD to the contacts 104, which protects the electronic circuitry in the card reader. FIG. 3 shows an exemplary grounding tab 134 extending from the cover 120 and FIG. 4 shows an exemplary grounding tabs 136 extending from engaging clips 122. When the card connector 100 is installed in the machine the tab 134 or 136 makes contact with a ground plane or ground trace on the circuit board in the card reader, or contact with a metallic chassis in the card reader.

Preferably, to provide further ESD protection, as shown in FIGS. 3 and 4, the cover 120 has a lip (tongue) 138 extending from the front edge of the cover 120. The lip 138 serves to guide the card 130 into the card connector 100, and also serves to direct any ESD to ground. As the card 130 is being inserted into the card connector 100 any ESD will preferentially jump from the card 130 the lip 138, and be directed to ground, before the card 130 has been inserted far enough for any ESD between the card 130 and the contacts 104.

Figure 5:
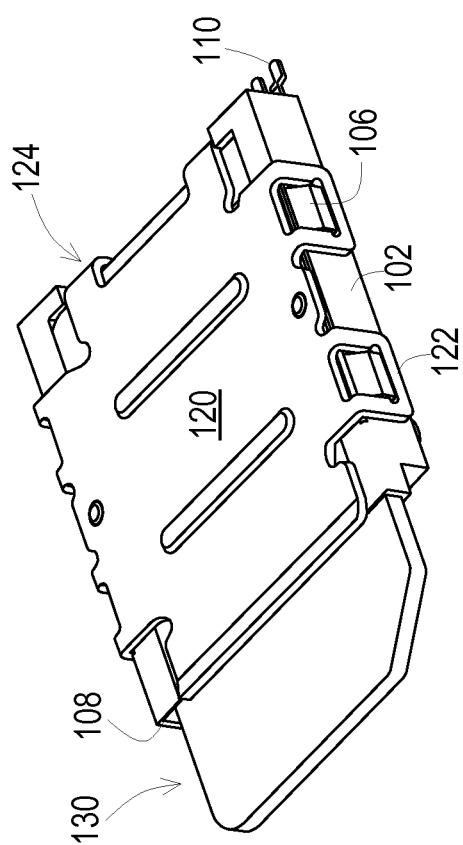
FIGS. 5 and 6 are perspective diagrams showing an exemplary assembled card connector with card inserted according to the present disclosure.
Figure 6:
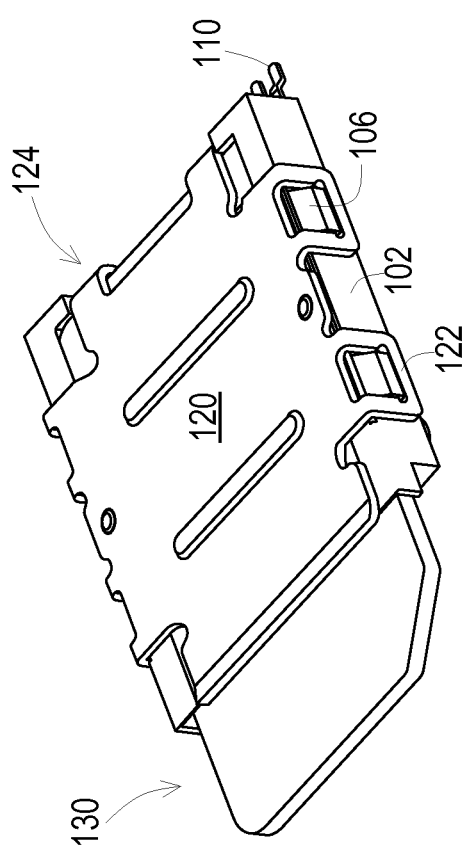

FIGS. 5 and 6 illustrate a card 130 fully inserted into a card connector 100. Complete insertion of the card 130 into the card reader 100 will cause power to be applied to the electronics embedded in the card 130. In use and in practice, a card 130 inserted into an operating card connector 100 located in an operating device generates heat. It is typically advantageous to dissipate the heat, or otherwise neutralize the effects of heat that might damage to the card 130.

An advantage of the heat conductive cover 120 is that it operates as a heat sink to draw and dissipate heat away from the card 130. Another advantage of the heat conductive cover 120 is that because it captures and substantially encases the card 130 the cover 120 restricts damage to the card 130, such as curling, warping or buckling. An ESD event may happen when the card 130 is first inserted into the connector 100, especially when the weather is cold and dry. Therefore, in addition to the cover 120 being made of a material which is thermally conductive, the cover 120 is preferably made of a material which is also electrically conductive, and the cover 120 is electrically connected to the circuit board 305 on which the connector 100 is mounted. This preferentially directs any electrostatic discharge to ground through the cover 120 and the ground plane of the circuit board, rather than through the contacts 104. The cover 120 may be made of any material which is thermally conductive and, preferably, electrically conductive, such as but not limited to steel, stainless steel, or aluminum.

Figure 7:
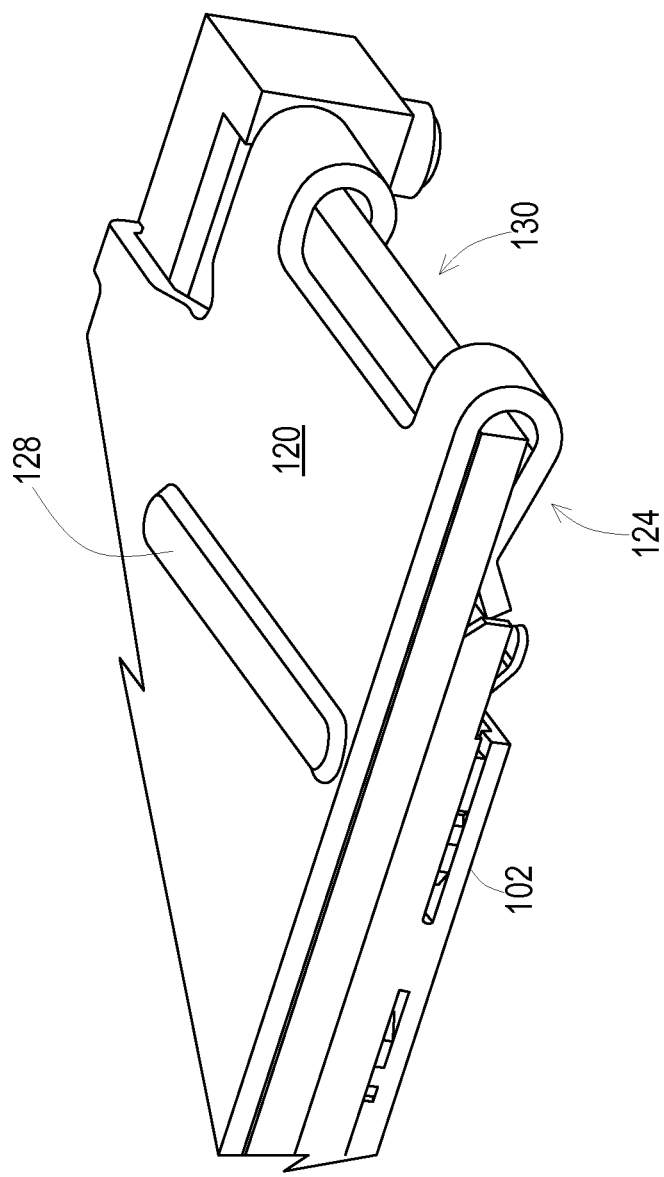
FIGS. 7 and 8 are perspective cross-sectional diagrams showing an exemplary card retaining feature according to the present disclosure.
Figure 8:
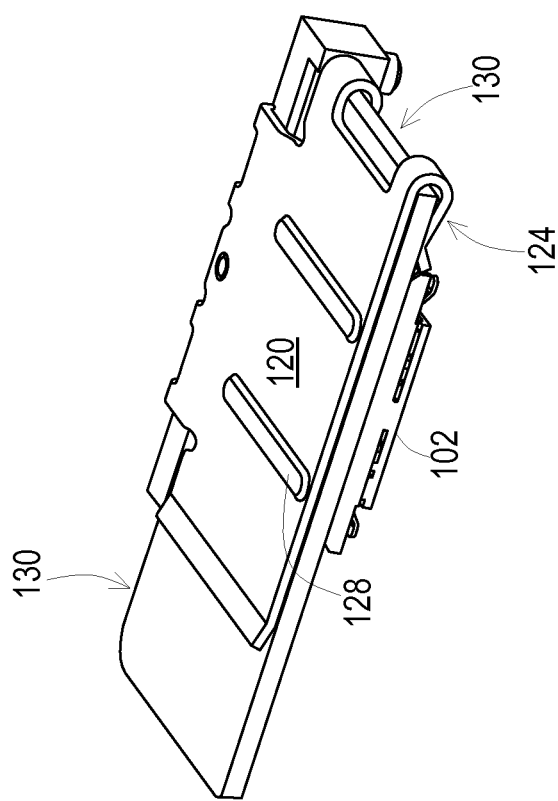

FIGS. 7 and 8 are cross-sectional views of a card 130 fully inserted into a card connector 100 and engaged by a retaining spring 124. An advantage of the retaining spring 124 is that it further engages the cover 120 and card 130 to draw and dissipate heat away from the card 130. Another advantage of the retaining spring 124 is that because it captures the leading edge of the card 130 the retaining spring 124 restricts damage to the card 130, such as curling, warping or buckling. In the illustrated embodiment, the spring 124 is approximately U-shaped and preferably has a leading edge guide 125 which serves to direct the card 130 into the spring 124.

Figure 9:
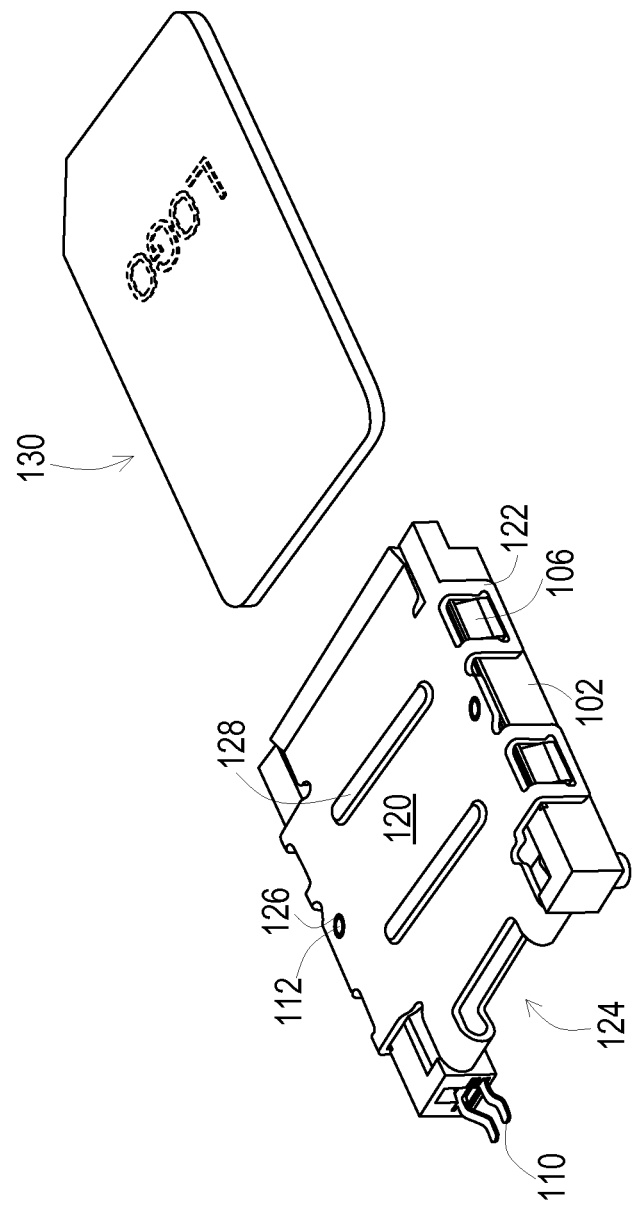
FIGS. 9-11 are perspective diagrams showing an exemplary assembled card connector according to the present disclosure.
Figure 10:
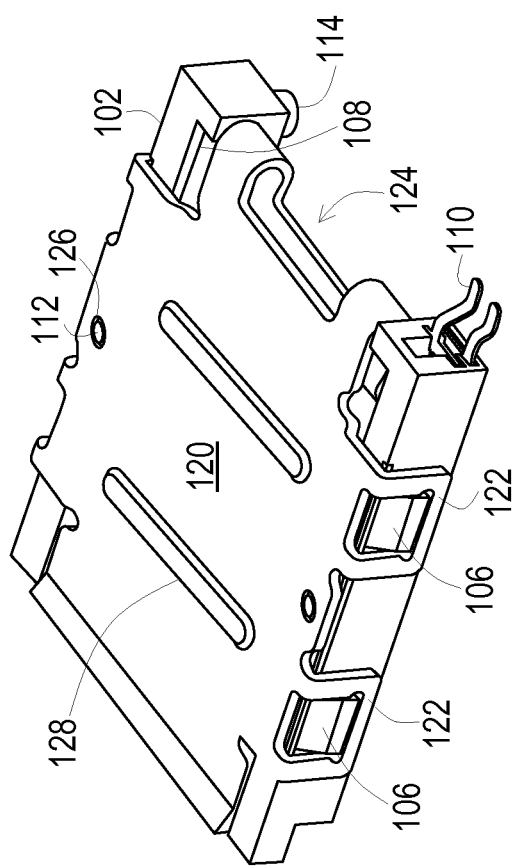
Figure 11:
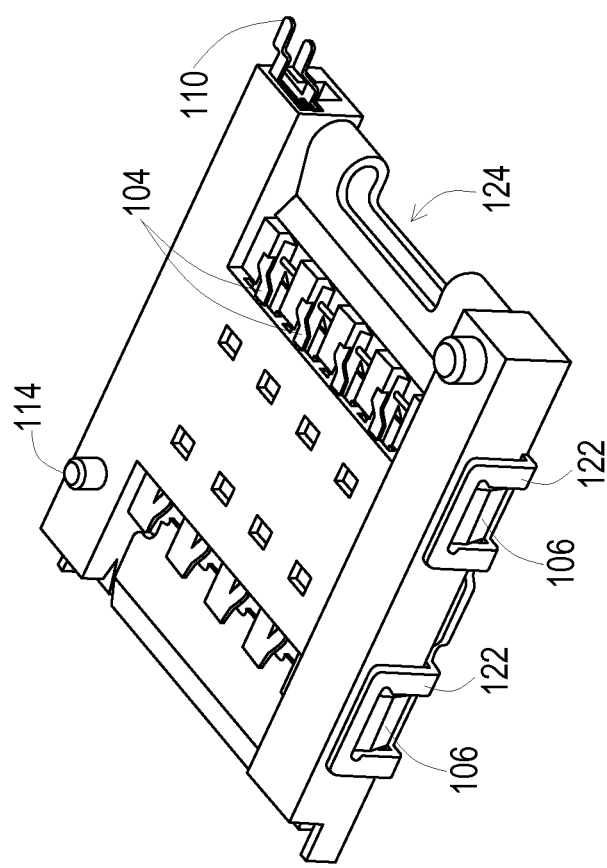
Figure 12:
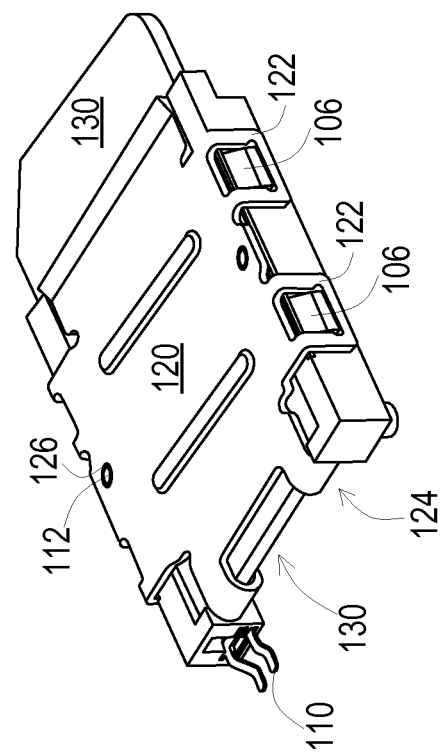
FIG. 12 is perspective diagram showing an exemplary card connector with card inserted according to the present disclosure.

FIGS. 9 and 10 are views of an assembled card connector 100 from rearward perspectives. FIG. 11 shows a view of the underside of an assembled card connector 100. FIG. 12 illustrates a view of a card 130 fully inserted into an assembled card connector 100. FIGS. 9-14 also show switch contacts 110, engaging posts 112, and mounting posts 114.

As used herein certain terms are merely for purposes of providing orientation, reference, or direction to the reader. In the context of the present disclosure the terms 'rearward', 'underside', 'downward', 'top', 'bottom', 'side', 'front' or 'back', their derivatives, combinations thereof, and the like are merely for the purpose of teaching a direction in relation to the card connector 100 or elements that comprise the card connector 100 and none are used in any sense that limits or restricts.

Figure 13:
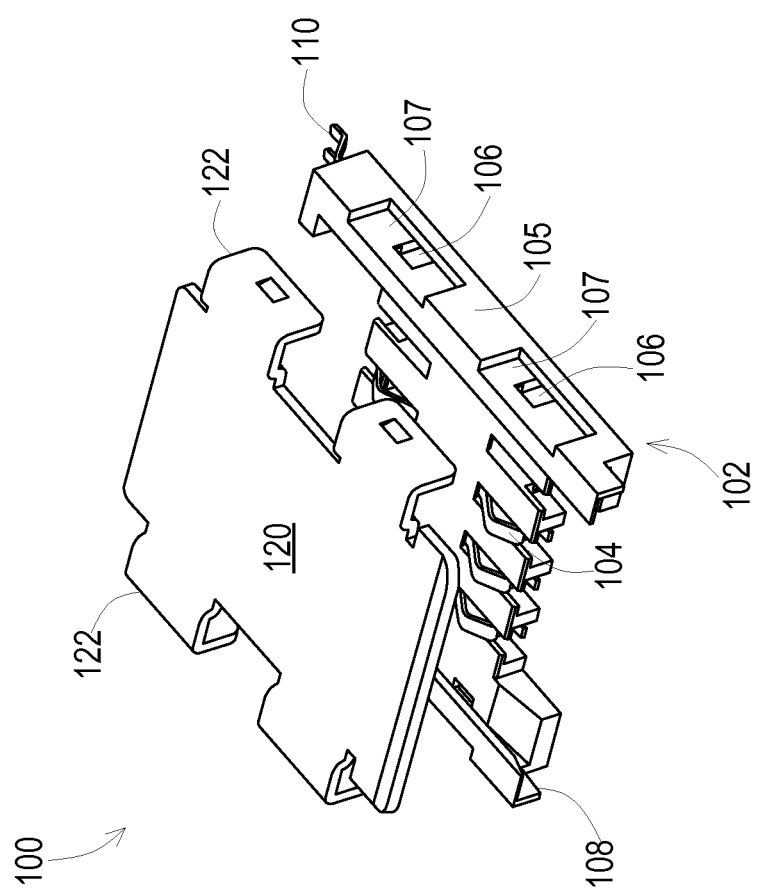
FIGS. 13-15 are perspective diagrams showing an alternative embodiment of an exemplary card connector according to the present disclosure.
Figure 14:
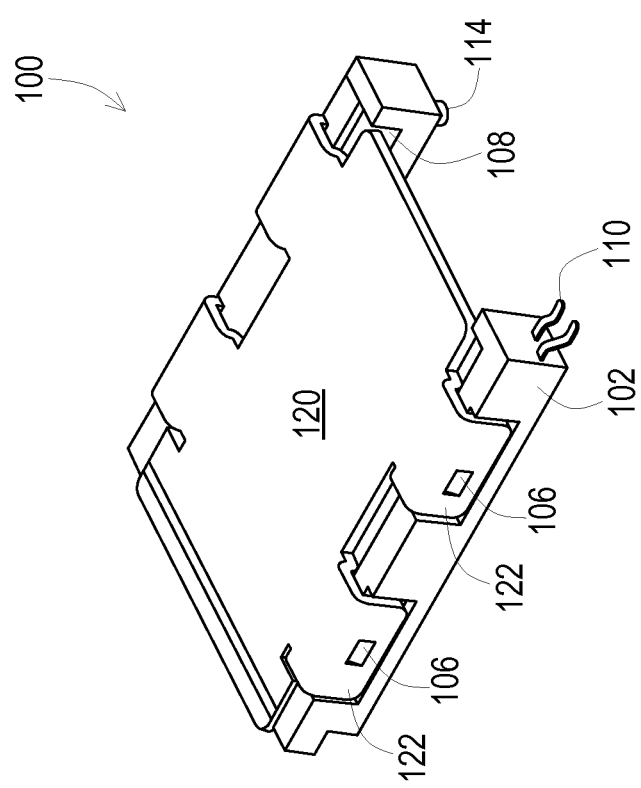
Figure 15:
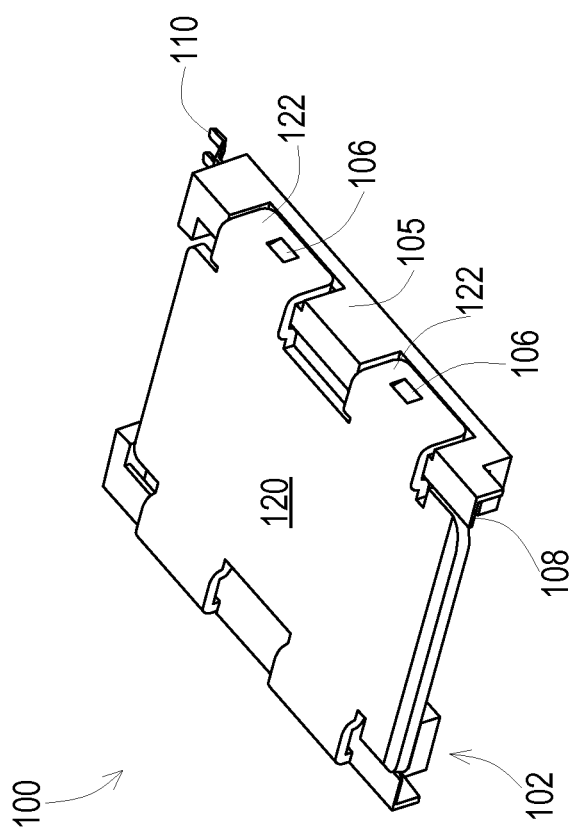

FIGS. 13-15 illustrate an alternative embodiment of an exemplary card connector 100. In this embodiment, the sidewalls 105 include a clip recess 107, configured to receive the engaging clips 122. This embodiment contemplates a retaining structure that engages or otherwise increases the force required to insert or withdraw a card 130 from the card connector 100, such as one or more leaf springs formed in the heat-dissipating cover 120 that contact the card 130. These leaf springs extend downwardly and are immediately adjacent to the body 102, or in contact with the body 102, and exert a downward force on the card 130 as it is inserted into, withdrawn from, and as it sits in the card connector 100. These leaf springs are likewise adjustable such that the force they exert may be variable to accommodate a desired situation.

Figure 16:
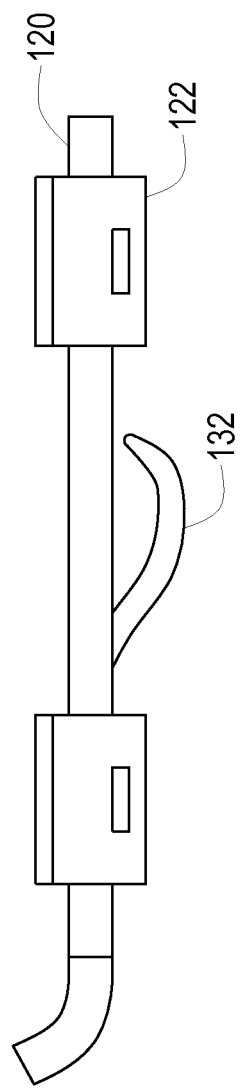
FIGS. 16 and 17 are perspective diagrams of an exemplary cover having one or more leaf springs.
Figure 17:
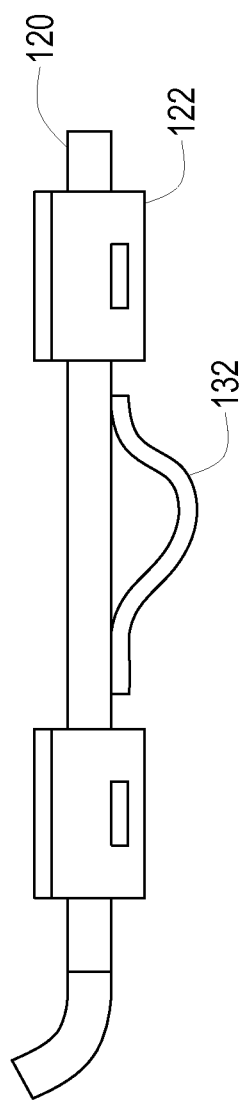

FIGS. 16 and 17 are perspective diagrams of an exemplary cover having one or more leaf springs. The underside of the cover 120 has at least one, and preferably two or more leaf springs 132. In FIG. 16 the leaf spring 132 is shown as being a stamped-out spring. In FIG. 17 the leaf spring 132 is shown as being a separate element which has been attached to the cover 120 by any convenient means, such as but not limited to soldering or welding, including ultrasonic welding. The leaf springs 132 may also provide additional channels for the heat of the card 130 to be more effectively transferred to the cover 120 for dissipation.

If the cover 120 is grounded then, if a leaf spring 132 is positioned toward the front of the cover 120, then that leaf spring 132 may also serve to preferentially direct ESD from the card 130 to ground so that there is not an ESD between the card 130 and the contacts 104.

Figure 18:
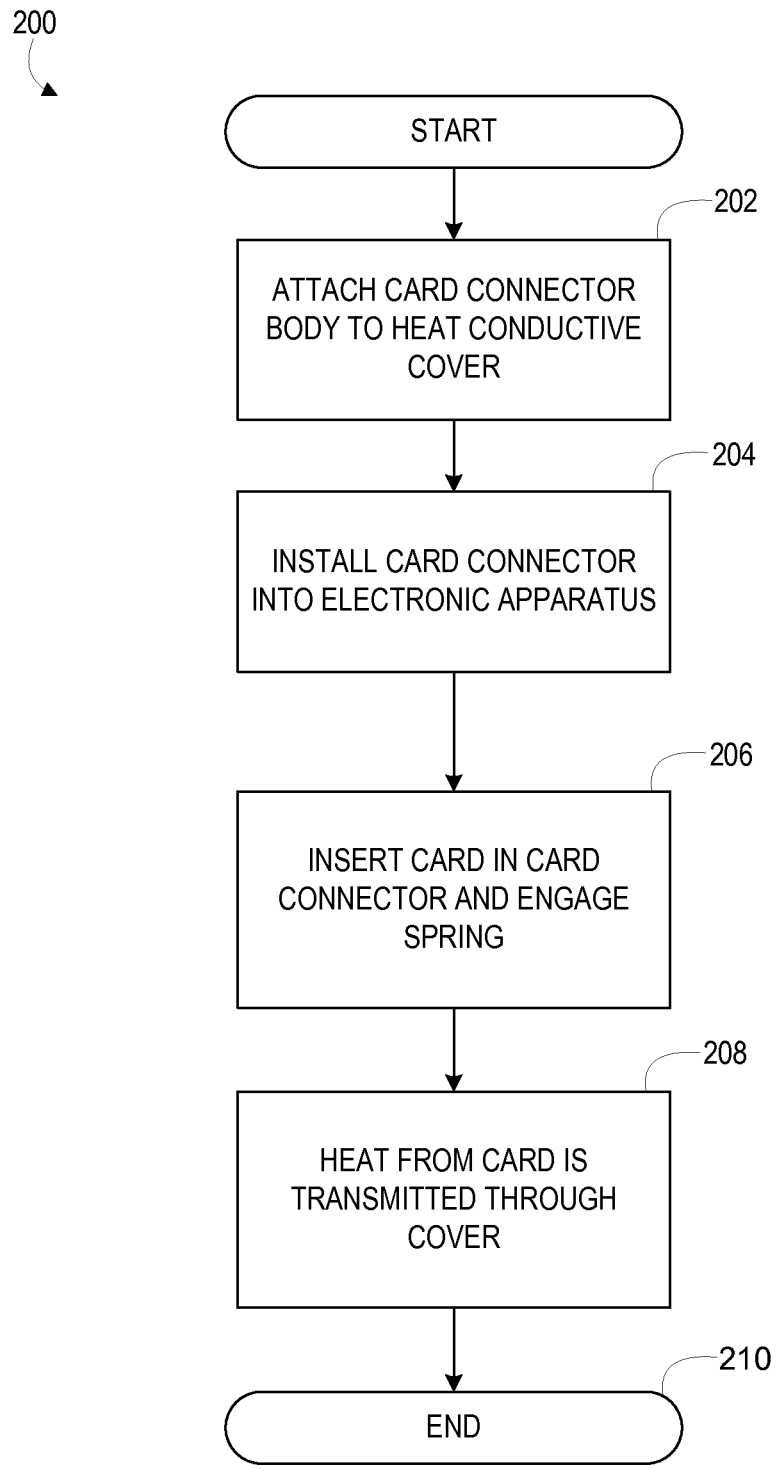
FIG. 18 is a logical flow diagram illustrating a process for manufacturing, assembling, and utilizing an exemplary card connector according to the present disclosure.

FIG. 18 is a logical flow diagram illustrating a process 200 for manufacturing, assembling, and utilizing the heat-dissipating card connector 100 disclosed herein. It should be appreciated that the operations described herein can be implemented as a sequence of manufacturing steps, mechanical operations, and physical processes. The implementation may vary depending on the performance and other requirements of a particular manufacturing system or electronic device in which the card connector 100 disclosed herein is utilized. It should also be appreciated that more or fewer operations may be performed than shown in the figures and described herein. These operations may also be performed in parallel, or in a different order than those described herein.

The process 200 can begin with operation 202 where an appropriate manufacturing procedure is utilized to mold the body 102 of the card connector 100. The other components of the body 102, best shown in FIGS. 1, 2 and 11, such as the electrical contacts 104, might also be molded into the body 102 of the card connector 100. An appropriate manufacturing procedure is utilized to form the heat conductive cover 120 of the card connector 100. The other components of the cover 120, best shown in FIGS. 1, 2, 7, 8 and 11 might also be formed into the cover 120 of the card connector 100. The body 102 may then be attached to the cover 120.

From operation 202, the routine 200 proceeds to operation 204, where the card connector 100 is installed into an electronic apparatus. As discussed above, the card connector 100 might be installed onto a circuit board utilized in a set-top box or other type of electronic device. Once the card connector 100 has been installed, the routine 200 proceeds to operation 206.

At operation 206, a card 130 is fully inserted into the card reader 100. The leading edge of a fully inserted card 130 is captured and engaged by the retaining spring 124. A force of approximately 3N-7N is exerted, in one embodiment, to fully insert the card 130 into the reader 100. At operation 208, heat generated by the card 130 is dissipated by the heat conductive cover 120. The routine 200 then continues to operation 210, where it ends.

FIG. 19 is an illustration of a possible installation of a card connector 100 in a card reader 300 having a circuit board 305 and electronic circuitry 310. The card reader 300 is installed in a machine 320 having a front panel 330. Also shown are the cover 120, lip 138, and a grounding tab, such as 134 or 136. Spacing between the components is for clarity of illustration and, although a gap may be present, the spacing does not indicate that a gap is necessary or desired.

Based on the foregoing, it should be appreciated that a heat-dissipating card connector 100 with ESD protection has been disclosed herein. Although the subject matter presented herein has been described in language specific to systems, methodological acts, mechanical and physical operations and/or configurations, and manufacturing processes, it is to be understood that the invention disclosed herein is not necessarily limited to the specific features, configurations, or components described herein. Rather, the specific features, configurations and components are disclosed as example forms. Further, all of the various features, configurations, and components need not be embodied in a single item to gain the benefits of other features, configurations, and components. For example, improved heat dissipation may be obtained without requiring that improved retention or ESD protection components be present.

The subject matter described herein is provided by way of illustration for the purposes of teaching, suggesting, and describing, and not limiting. Alternatives to the illustrated embodiment are contemplated, described herein, and set forth in the claims. Various modifications and changes may be made to the subject matter described herein without following the example embodiments and applications illustrated and described, and without departing from the true spirit and scope of the present invention.

It should be appreciated that the above-described subject matter may also be implemented as an electrical apparatus, a manufacturing process, an electrical and mechanical system, or as an article of manufacture. The features, functions, and advantages that have been discussed can be achieved independently in various embodiments of the present disclosure or may be combined in yet other embodiments.

What is claimed is:

1. A card connector for use with a card comprising electronic circuitry and a card reader device comprising electronic circuitry which can communicate with the card, the card connector comprising:
    a connector body having an electrically-insulating base, electrical contacts in the base, a pair of sidewalls on opposite sides of the base and extending in a predetermined direction from the base, a pair of rails extending toward each other, each rail extending from a respective sidewall, the rails being separated from the base by a distance sufficient to allow the card to be inserted into the card connector, the electrical contacts functionally connecting the electronic circuitry of the card to the electronic circuitry of the device when the card is inserted into the card connector, engaging tabs, and engaging posts extending from the rails, wherein at least one of the base, a sidewall of the pair of sidewalls, or a rail of the pair of rails, is thermally conductive; and
    a heat conductive cover, attached to the connector body, and in thermal contact with the card when the card is inserted into the card connector, the heat conductive cover having a plurality of "U"-shaped heat conducting springs at one end of the heat conductive cover for engaging the card when the card is inserted into the card connector, engaging clips configured to engage the engaging tabs and apertures configured to accept the engaging posts, a plurality of stiffener ribs, a surface facing the connector body and a plurality of heat conducting spring extending from the surface of the heat conductive cover, the heat conductive cover being electrically conductive and having a grounding tab and a lip on a front edge of the cover, the lip extending beyond a front edge of the connector body;
    wherein at least one of the heat conducting springs limits the insertion of the card into the card connector;
    whereby the engaging tabs and the engaging clips, when engaged, secure the heat conductive cover to the connector body;
    whereby the engaging posts and the apertures, when engaged, align the connector body and the heat conductive cover;
    whereby the at least one "U"-shaped heat conducting spring engages the card when the card is inserted into the card connector;
    whereby the grounding tab is configured to contact a ground in the card reader; and
    whereby the heat conducting spring extending from the surface of the heat conductive cover contacts the card and urges the card toward the connector body when the card is inserted into the card connector.

2. A card connector for use with a card comprising electronic circuitry and a card reader device having electronic circuitry which can communicate with the card, the card connector comprising:
    a connector body having electrical contacts, the electrical contacts functionally connecting the electronic circuitry of the card to the electronic circuitry of the device when the card is inserted into the card connector; and
    a heat conductive cover, attached to the connector body, and in thermal contact with the card when the card is inserted into the card connector, the heat conductive cover having at least a first heat conducting spring to engage the card when the card is inserted into the card connector and a second heat conducting spring to limit the insertion of the card into the card connector.

3. The card connector of claim 2 wherein:
    the connector body comprises engaging tabs; and
    the heat conductive cover comprises engaging clips configured to engage the engaging tabs;
    whereby the engaging tabs and the engaging clips, when engaged, secure the heat conductive cover to the connector body.

4. The card connector of claim 2 wherein the first heat conducting spring is at a front end of the heat conductive cover and engages the card when as the card is being inserted into the card connector.

5. The card connector of claim 2 wherein:
    the second heat conducting spring is at a back end of the heat conductive cover;
    the second heat conducting spring has a "U"-shape at an end extending from the back end of the heat conductive cover; and
    the "U"-shaped end engages the card when the card is inserted into the card connector.

6. The card connector of claim 2 wherein:
    the heat conductive cover has a surface facing the connector body;
    the first heat conducting spring extends from the surface of the heat conductive cover; and
    the first heat conducting spring contacts the card and urges the card toward the connector body when the card is inserted into the card connector.

7. The card connector of claim 2 wherein the electrical contacts of the connector body contact the card and urge the card toward the heat conductive cover when the card is inserted into the card connector.

8. The card connector of claim 2 wherein the connector body comprises:
    a base containing the electrical contacts, the base being electrically-insulating;
    a pair of sidewalls extending in a predetermined direction from the base, the sidewalls being on opposite sides of the base;
    a pair of rails, each rail extending from a respective sidewall, the rails extending toward each other, the rails being separated from the base by a distance sufficient to allow the card to be inserted into the card connector.

9. The card connector of claim 8 wherein at least one of the base, a sidewall of the pair of sidewalls, or a rail of the pair of rails, is thermally conductive.

10. The card connector of claim 2 wherein the heat conductive cover is electrically conductive and has a component configured for electrically connecting the heat conductive cover to the connector body or to the card reader device.

11. The card connector of claim 2 wherein the heat conductive cover has at least one stiffener rib.

12. The card connector of claim 2 wherein the heat conductive cover has a plurality of stiffener ribs which run laterally across the heat conductive cover.

13. The card connector of claim 2 wherein the heat conductive cover has a lip extending beyond a front edge of the connector body to guide the card into the card connector.

14. The card connector of claim 2 wherein the heat conductive cover has at least one grounding tab configured for electrically connecting the heat conductive cover a ground on the card reader device.

15. The card connector of claim 2 wherein the heat conductive cover has a lip extending beyond a front edge of the connector body and at least one grounding tab configured for electrically connecting the heat conductive cover a ground on the card reader device, whereby, when a card is inserted into the card reader device, the lip makes contact with the card and discharges static electricity from the card to ground through the conductive cover in preference to discharging static electricity from the card to ground through the electrical contacts.

16. A card connector for use with a card comprising electronic circuitry and a card reader device having electronic circuitry which can communicate with the card, the card connector comprising:
   a connector body having:
      electrical contacts, the electrical contacts functionally connecting the electronic circuitry of the card to the electronic circuitry of the device when the card is inserted into the card connector,
      a base containing the electrical contacts, the base being electrically-insulating,
      a pair of sidewalls extending in a predetermined direction from the base, the sidewalls being on opposite sides of the base, and
      a pair of rails, each rail extending from a respective sidewall, the rails extending toward each other, the rails being separated from the base by a distance sufficient to allow the card to be inserted into the card connector, the pair of rails have respective engaging posts; and
   a heat conductive cover, attached to the connector body, and in thermal contact with the card when the card, is inserted into the card connector the heat conductive cover having at least one heat conducting spring for engaging, the card when the card is inserted into the card connector, the heat conductive cover further comprising apertures configured to accept the engaging posts;
   whereby the engaging posts and the apertures, when engaged, align the connector body and the heat conductive cover.

17. The card connector of claim 16 wherein there are at least two heat conducting springs, the heat conducting springs being located on opposite ends of the heat conductive cover and engage the card when the card is inserted into the card connector.

18. The card connector of claim 16 wherein the electrical contacts urge the card toward the heat conductive cover.

* * * * *

UNITED STATES PATENT AND TRADEMARK OFFICE
CERTIFICATE OF CORRECTION

PATENT NO. : 9,122,899 B2  
APPLICATION NO. : 14/088044  
DATED : September 1, 2015  
INVENTOR(S) : Hodge et al.

Page 1 of 1

It is certified that error appears in the above-identified patent and that said Letters Patent is hereby corrected as shown below:

On the Title Page, change under

(72) Inventors: second inventor's first name should be changed from "Tau" to --Tao--.

Signed and Sealed this
Nineteenth Day of April, 2016

Michelle K. Lee
*Director of the United States Patent and Trademark Office*